March 3, 1959 F. M. GIST 2,875,489
CABLE CLIP
Filed Feb. 24, 1955

INVENTOR
Fred Morgan Gist

Ashley & Ashley

BY

ATTORNEYS

United States Patent Office 2,875,489
Patented Mar. 3, 1959

2,875,489

CABLE CLIP

Fred Morgan Gist, Midland, Tex.

Application February 24, 1955, Serial No. 490,220

2 Claims. (Cl. 24—115)

This invention relates to new and useful improvements in cable clips.

One object of the invention is to provide an improved clip for positively fastening a wire rope or cable to the convex or curved surface of a collar or other member in which the cable is locked against displacement by deforming the clip in conformity with the curvature of the collar or member prior to attachment of said clip to said collar or member.

Another object of the invention is to provide an improved cable clip of the character described, having a complementary recess for receiving a portion of the cable whereby the recess and cable portion are deformed upon bending of the collar or other member so as to confine the cable portion in said recess in engagement with said collar or member without weakening said cable.

A further object of the invention is to provide an improved cable clip which includes a plate having a groove extending transversely of the curvature of the plate for receiving the cable, the groove being semi-cylindrical and having a radius substantially equal to the radius of said cable prior to bending of said plate whereby said groove is partially closed so as to deform and confine said cable therein upon bending of said plate to form the clip.

A construction designed to carry out the invention will be hereinafter described, together with other features of the invention.

Figure 1:
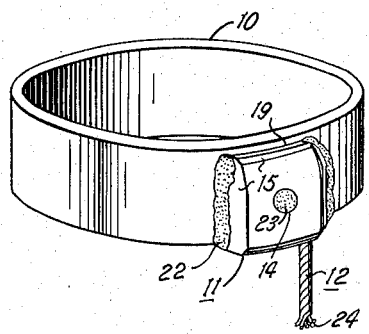

The invention will be more readily understood from a reading of the following specification and by reference to the accompanying drawings, wherein an example of the invention is shown, and wherein:

Fig. 1 is a perspective view of a cable clip constructed in accordance with the invention and attached to a collar.

Figure 2:
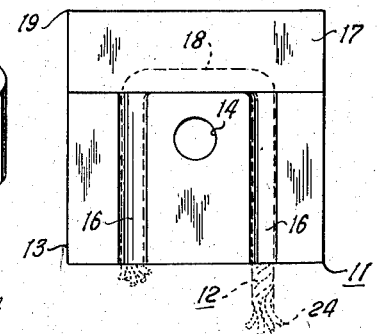
Figure 3:
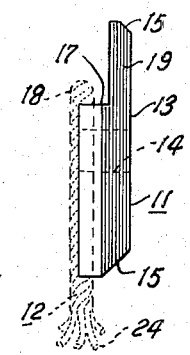
Figure 4:
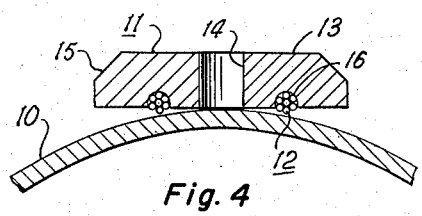
Figure 5:
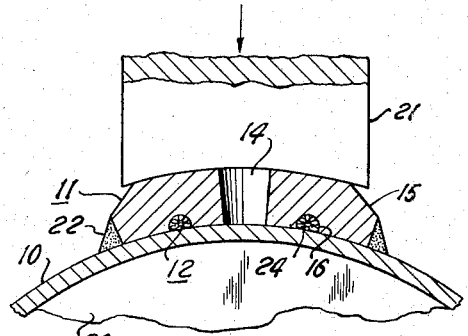
Figure 7:
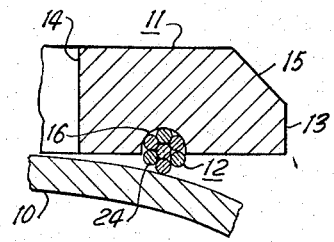
Figure 6:
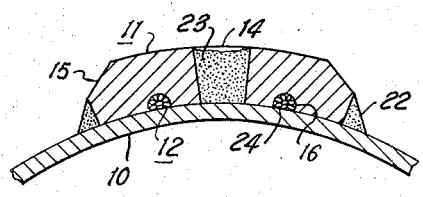
Figure 8:
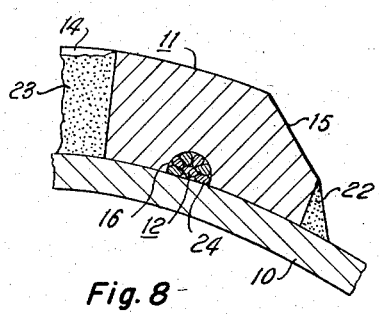

Fig. 2 is a rear elevational view of the flat plate employed in forming the clip and showing its recesses, Fig. 3 is a side elevational view of the flat plate, Fig. 4 is a sectional view showing the plate positioned on the collar with the cable in the recesses prior to deforming, Fig. 5 is a sectional view showing the plate after being bent to provide a clip conforming to the collar, Fig. 6 is a sectional view of the clip welded to the collar, Fig. 7 is an enlarged sectional view of a portion of the flat plate, showing the relation of the cable to the collar and one of the recesses, and Fig. 8 is an enlarged sectional view of a portion of the clip welded to the collar, showing one of the deformed grooves and the cable therein.

In the drawing, the numeral 10 designates a collar or other member having a curved or cylindrical external surface. A clip 11 is welded to the exterior of the collar for positively fastening a wire rope or cable 12 thereto and includes a rectangular plate 13 which may have an opening 14 in its central portion. Prior to forming the clip 11, the plate 13 is flat and has the edge portions 15 of its front or outer surface bevelled or chamfered. One or more and preferably a pair of grooves or recesses 16 are formed in the rear or inner surface of the plate for receiving the cable 12 and extend in spaced, substantially parallel relation (Fig. 2). Each groove 16 is semi-cylindrical and of a width substantially equal to the diameter of the cable and of a depth slightly greater than the radius of said cable whereby said cable snugly engages within the groove with less than one-half of said cable projecting from said groove (Figs. 3, 4 and 7).

When two or more grooves are provided, one or both of the ends of the grooves are connected by a transverse recess 17 to accommodate a loop 18 of the cable between the portions thereof within said groove. As shown in Figs. 2 and 3, a single recess 17 extends entirely across one end of the rear surface of the plate for connecting a pair of the grooves 16 at substantially a right angle and may be of greater depth than the grooves. In order to permit deforming of the recessed portion of the plate into overlying relation to the cable loop 18, said plate portion is relatively thin as shown by the numeral 19.

Prior to the formation of the clip 11, the cable 12 is placed in the grooves 16 with its loop 18 in the recess 17 of the plate 13. One end of the cable may be cut or terminate substantially flush with the free or outer end of one of the grooves. Then the assembled plate and cable are positioned on the external surface of the collar or other member 10 with the grooves adjacent and extending transversely of and preferably at a right angle to the curvature of said collar or member (Fig. 4). In order to form the clip, the collar or member is mounted on a complementary form or support 20 and positioned in a press, the plunger or ram of which has a complementary die 21 (Fig. 5).

Upon the application of appropriate pressure, the die deforms the plate 13 into engagement with the collar or member to provide the curved clip 11 in conformity with the curvature of said collar or member. While confined by the die, the clip is attached to the collar by welding at its transverse edge portions and at its central opening 14 as shown by the numerals 22 and 23, respectively (Figs. 6 and 8). After welding and removal from the press, the thin portion 19 of the plate may be hammered or otherwise bent inwardly toward the collar or member so as to overlie the cable loop 18 (Fig. 1). It is pointed out that the bevelled or chamfered edge portions 15 facilitate the application of the welding material 22 to the transverse edge portions as well as eliminate undesirable sharp corners.

Since approximately one-fourth of the cable 12 projects from the grooves 16 initially, it is manifest that said cable is deformed upon the bending of the plate 13 to form the clip. The individual strands 24 of the cable are tightly compressed and deformed so as to completely fill the grooves whereby said cable is frictionally gripped by the walls of said grooves to connect the cable to the clip without materially weakening said cable. As shown in Fig. 8, the longitudinal margins of each groove are forced toward each other upon deformation of the plate. In effect, the cable and its strands are forged to the adjacent surfaces of the grooves.

In view of this forging action, the cable is clampingly confined and its loop 18 is not absolutely essential to prevent its displacement. Although the double groove and loop arrangement is more positive and preferable, the confinement of the cable in a single groove is satisfactory for some purposes. It is readily apparent that the clip provides a relatively inexpensive and efficacious attachment for a wire rope or cable to a collar or other member having a convex or cylindrical surface. Manifestly, the clip occupies a minimum space and affords ample clearance externally of the collar or other member.

The foregoing description of the invention is explanatory thereof and various changes in the size, shape and

What I claim and desire to secure by Letters Patent is:

1. A clip for fastening a wire rope to the convex surface of a member including a plate having a substantially semi-cylindrical groove, the groove having a depth slightly greater than the radius of the rope and a width substantially equal to the diameter of the rope, the plate being curved complementary to the convex surface and inwardly toward and transversely of the longitudinal axis of said groove, the rope being compressed in said groove and arcuately flattened against the convex surface so as to be confined against displacement.

2. A clip for fastening a wire rope to the convex surface of a member including a plate having a pair of spaced substantially parallel grooves and a transverse recess connecting one of the ends of the grooves, each groove being substantially semi-cylindrical and having a depth slightly greater than the radius of the wire rope and a width substantially equal to the diameter of the rope, the plate being curved complementary to the convex surface and inwardly toward and transversely of the longitudinal axes of said grooves, the rope being compressed in said grooves and arcuately flattened against the convex surface so as to be confined against displacement.

References Cited in the file of this patent

UNITED STATES PATENTS

| Number | Name | Date |
|---|---|---|
| 206,021 | Holt | July 16, 1878 |
| 379,221 | Hering | Mar. 13, 1888 |
| 663,490 | Cleveland | Dec. 11, 1900 |
| 963,035 | Cope | July 5, 1910 |
| 1,390,596 | Thornton | Sept. 13, 1921 |
| 1,927,382 | Andrew | Sept. 19, 1933 |
| 2,047,633 | Jacobus | July 14, 1936 |
| 2,444,599 | Genter | July 6, 1948 |